Patented June 14, 1949

2,473,434

UNITED STATES PATENT OFFICE 2,473,434

METHOD FOR PREPARING HYDROCARBO-METALLIC HALIDES

Richard V. Lindsey, Jr., Marshallton, Del., assignor to E. I. du Pont de Nemours & Company, Wilmington, Del., a corporation of Delaware No Drawing. Application June 27, 1946, Serial No. 679,855

9 Claims. (Cl. 260—431)

This invention relates to organometallic halides. More particularly this invention relates to a new and improved process for the preparation of hydrocarbometallic halides of group II—B metals in the long periods of the periodic table.

The organometallic halides have heretofore been prepared by a variety of methods, such as by the reaction of mercuric halides with certain mixed organometallic compounds including those of zinc, magnesium and lead. The reaction of mercuric halides with mercury dialkyls has also been employed. However, these methods are not entirely satisfactory and most of them have serious disadvantages. For example, the organometallics employed, such as those of zinc, lead and mercury, are highly toxic and dangerous to handle. Where organomagnesium compounds are employed large volumes of expensive solvents are required in their preparation.

It is an object of this invention to provide a new method of preparing hydrocarbometallic halides wherein the metal is from group II—B in the long periods of the periodic table. A further object is to provide an efficient and economic process of preparing hydrocarbometallic halides of mercury, zinc and cadmium from readily accessible materials. A still further object is to provide a new method of preparing hydrocarbomercuric halides in good yields from relatively non-toxic and inexpensive starting materials. Other objects will appear hereinafter.

These objects are accomplished by the following invention of a method for the preparation of hydrocarbometallic halides which comprises reacting in an anhydrous inert organic diluent a metallic halide selected from the class consisting of the chlorides, bromides and iodides of the metals of group II—B in the long periods of the periodic table with an organo-aluminum compound containing at least one monovalent hydrocarbon radical free from aliphatic and alicyclic unsaturation and wherein the aluminum atom is attached solely to members selected from the class consisting of chlorine, bromine, iodine and monovalent hydrocarbon radicals free from aliphatic and alicyclic unsaturation. The resulting hydrocarbometallic halide is isolated from the reaction mixture by any convenient method, as by filtration, and can be purified by washing or recrystallization from a suitable solvent.

The prefix "hydrocarbo" refers to any hydrocarbon radical. However, since the presence of aliphatically unsaturated reactants is undesirable in the process of this invention because of the possibility of side reactions, the hydrocarbon radicals are specified as being those which are free from aliphatic and alicyclic unsaturation, that is free from non-benzenoid unsaturation. Thus the hydrocarboaluminum compounds suitable for use in this process are those in which the hydrocarbon groups are saturated or have only aromatic unsaturation, that is those in which the hydrocarbon groups are alkyl, cycloalkyl, aryl or aralkyl.

The organoaluminum compounds suitable for use in the process of this invention are the trihydrocarboaluminums and the hydrocarboaluminum halides which can be represented respectively by the formulas $R_3Al$ and $R_nAlX_{3-n}$ wherein R is a hydrocarbon radical free from aliphatic and alicyclic unsaturation, that is alkyl, cycloalkyl, aryl or aralkyl, X is chlorine, bromine or iodine, and $n$ is the integer 1 or 2. Particularly useful, because of their ready accessibility, are the so-called alkylaluminum sesquihalides which are mixtures of monoalkylaluminum dihalides and dialkylaluminum monohalides. These mixtures have the gross formula $R_3Al_2X_3$, wherein R is an alkyl radical and X is chlorine, bromine or iodine. The preferred materials are the alkylaluminum sesquihalides, in particular the sesquichlorides, in which the alkyl group has from one to three carbon atoms, since these are at present the most readily available products of this type.

In the preparation of hydrocarbomercury halides, either mercuric chloride, bromide or iodide may be used but mercuric chloride is preferred since it is cheaper and reacts very satisfactorily. For the preparation of hydrocarbozinc and hydrocarbocadmium halides, the corresponding zinc and cadmium halides are used in place of mercury halides. Thus there may be used in the process of this invention any metallic halide wherein the metal is from group II—B in the long periods of the periodic table, that is mercury, zinc and cadmium and the halogen is one of atomic weight above 19, that is chlorine, bromine and iodine. It is preferable that any halogen in the organoaluminum compound be the same as the halogen in the metallic halide.

The term "inert diluent" refers to an anhydrous organic liquid medium which has no decomposing action on the reactants or reaction products. The term includes diluents which may combine with the organoaluminum compounds without destroying their chemical nature, such as the ethers which are known to add to the organoaluminum compounds to give the so-called "etherates." The saturated aliphatic and alicyclic hydrocarbons are economical and therefore preferred. It is only necessary to use an amount of diluent sufficient to keep the reaction mixture fluid enough to permit good contact between the reactants.

The temperature of the reaction is not critical provided it does not exceed the point at which decomposition or disproportionation of the organoaluminum compounds takes place. For practical reasons a temperature between 0° C. and 150° C. is preferred. Superatmospheric pressure may be used with low boiling diluents if necessary.

The reaction which takes place in the process of this invention is represented by the following equation, showing the reaction of methylaluminum sesquichloride with mercuric chloride:

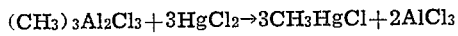
$$(CH_3)_3Al_2Cl_3 + 3HgCl_2 \rightarrow 3CH_3HgCl + 2AlCl_3$$

likewise, the trihydrocarboaluminums, for example aluminum triethyl, and the dihydrocarboaluminum monohalides and monohydrocarboaluminum dihalides react with mercuric halide in the presence of an inert diluent to give a hydrocarbomercuric halide and aluminum halide. In all cases the reaction stops after the introduction of one hydrocarbon group, that is dihydrocarbomercury compounds are not produced in detectable amounts.

The best results are obtained when the reactants are employed in approximately stoichiometrical proportions, for example 3 moles of mercuric halide per mole of alkylaluminum sesquihalide or trialkyl aluminum. An excess of either reactant may be used, but if so, it is preferable to use an excess of the organoaluminum compound since an excess of mercury halide might complicate the isolation of the hydrocarbomercury halide. All operations should be carried out in an atmosphere substantially free from oxygen and moisture to avoid decomposition of the organoaluminum compounds which are readily hydrolyzable and spontaneously inflammable in air.

The invention is further illustrated by the following examples in which parts are by weight unless otherwise specified.

*Example I*

A solution of 23 parts (0.11 mole) of methylaluminum sesquichloride in 39 parts of dry cyclohexane is added slowly with stirring to a suspension of 81.5 parts (0.3 mole) of mercuric chloride in 79 parts of cyclohexane contained in a vessel fitted with gas-tight stirrer, reflux condenser and dropping funnel. All operations are carried out in an atmosphere of dry, oxygen-free nitrogen. This is done in the laboratory by operating in a closed box provided with sleeves for the operator's hands and through which a slow stream of dry nitrogen is continuously circulated. Reaction is evidenced by a moderate warming of the mixture, but there is no noticeable change in the appearance of the solid. When the addition is completed, the mixture is heated to reflux temperature (80–85° C.) for 3 hours, then cooled. Any unreacted organoaluminum compound is decomposed by treatment of the reaction mixture with cold, dilute (about 1%) hydrochloric acid. The solid material (crude methylmercuric chloride) is filtered and recrystallized from alcohol. There is obtained 50 parts of purified methylmercuric chloride, M. P. 171° C., corresponding to a yield of 67% of the theory based on the mercuric chloride.

*Example II*

In the manner of the foregoing example, a solution of 15.5 parts (0.062 mole) of ethylaluminum sesquichloride in 39 parts of cyclohexane is added to a suspension of 51 parts (0.188 mole) of mercuric chloride in 79 parts of cyclohexane, after which the mixture is refluxed for one hour and decomposed by addition of dilute hydrochloric acid. The solid reaction product is filtered and recrystallized from alcohol to give 33 parts of purified ethylmercuric chloride, M. P. 190–191° C., corresponding to a yield of 66% of the theory.

*Example III*

In the manner of the preceding examples, a solution of 28.4 parts (0.06 mole) of methylaluminum sesquiiodide in 39 parts of cyclohexane is added to a suspension of 45 parts (0.1 mole) of mercuric iodide in 79 parts of cyclohexane. After refluxing for five hours, the product is isolated as above and purified by recrystallization from methanol to give 15.5 parts of methylmercuric iodide, M. P. 142–143° C., corresponding to a yield of 45% of the theory.

*Example IV*

A solution of 8 parts (0.11 mole) of aluminum trimethyl in 39 parts of cyclohexane is added with stirring over a period of 40 minutes to a suspension of 81.5 parts (0.3 mole) of mercuric chloride in 79 parts of cyclohexane, after which the mixture is heated to 80° C. for 45 minutes and treated with cold, 1% hydrochloric acid. The crude methylmercuric chloride is collected and recrystallized from alcohol. The yield of purified material is 70% of the theory.

A most critical factor in the process of this invention is the use of a diluent. When the diluent is omitted the reaction proceeds very vigorously but it takes an undesirable course in that considerable free metal is formed. Thus where mercuric halide is employed, free mercury can readily be seen by visual observation. Under such conditions, the yield of hydrocarbomercuric halide is impractically small, or even non-existent.

Any inert solvent or diluent, that is any anhydrous organic liquid which has no decomposing action on the reactants or reaction product is suitable. Examples of the anhydrous inert organic solvents which may be used in this invention include hydrocarbons free from aliphatic and alicyclic unsaturation, such as hexane, isooctane, petroleum ether, kerosene, benzene, toluene and saturated ethers, such as diethyl ether, di-n-butyl ether and the like.

Examples of hydrocarboaluminum compounds which can be used in the process of this invention include the trihydrocarboaluminums, such as trimethyl and triphenylaluminum; the dihydrocarboaluminum monohalides, such as diethylaluminum bromide; the monohydrocarboaluminum dihalides, such as isopropylaluminum dichloride; and mixtures of the last two mentioned types of aluminum compounds, the hydrocarboaluminum sesquihalides, which are obtained by reacting a halogenohydrocarbon with aluminum metal. Methods of preparing these organoaluminum compounds are described by von Grosse and Mavity in J. Org. Chem. 5, 106 (1940).

The reaction time is not very critical since the reaction proceeds spontaneously and is in general substantially complete after the reactants have been brought in intimate contact. Either reactant may be added to the other but it is in general more convenient to add the organoaluminum compound to the mercuric halide.

At the end of the reaction, it is desirable to destroy any unreacted organoaluminum compound so that further operations may be carried out without special precautions. This is best done by treating the reaction mixture with water or with dilute, cold acid, for example 1/10 N to N hydrochloric or sulfuric acid. The hydrocarbomercury halides may then be isolated by filtration and, if desired, purified by washing or by recrystalization from any suitable solvent. The hydrocarbomercury halides, for example the alkyl and arylmercuric chlorides, are known compounds which may be identified without difficulty.

The hydrocarbometallic halides, and particularly the hydrocarbomercuric halides, produced by the process of this invention are industrially important as fungicides, bactericides, germicides and as disinfecting agents in the treatment of seeds, lumber and the like. They are also scientifically important as intermediates in many syntheses.

As many apparently widely different embodiments of this invention may be made without departing from the spirit and scope thereof, it is to be understood that I do not limit myself to the specific embodiments thereof except as defined in the appended claims.

I claim:
1. A method for preparing hydrocarbometallic halides which comprises reacting at a temperature below the decomposition temperature of the reactants under an atmosphere free from oxygen and moisture a bihalide of a metal of group II—B in the long periods of the periodic table with an organoaluminum compound in an anhydrous inert organic liquid solvent therefor, said organoaluminum compound containing at least one monovalent hydrocarbon radical free from nonbenzenoid unsaturation and wherein the valences of aluminum are satisfied solely by members selected from the class consisting of halogen atoms and hydrocarbon radicals as aforesaid, the halogens in both of said reactants having an atomic number between 16 and 54, and isolating the resulting hydrocarbometallic halide.

2. A method for preparing hydrocarbomercury halides which comprises reacting at a temperature below the decomposition temperature of the reactants under an atmosphere free from oxygen and moisture a mercuric halide with an organoaluminum compound in an anhydrous inert organic liquid solvent therefor, said organoaluminum compound containing at least one monovalent hydrocarbon radical free from nonbenzenoid unsaturation and wherein the valences of aluminum are satisfied solely by members selected from the class consisting of halogen atoms and hydrocarbon radicals as aforesaid, the halogens in both of said reactants having an atomic number between 16 and 54, and isolating the resulting hydrocarbomercury halide.

3. A method for preparing hydrocarbometallic halides which comprises reacting at a temperature below the decomposition temperature of the reactants under an atmosphere free from oxygen and moisture a bihalide of a metal of group II—B in the long periods of the periodic table with an alkylaluminum sesquihalide in an anhydrous inert organic liquid solvent therefor, the halogens in both of said reactants having an atomic number between 16 and 54, and isolating the resulting hydrocarbometallic halide.

4. A method for preparing hydrocarbometallic chlorides which comprises reacting at a temperature below the decomposition temperature of the reactants under an atmosphere free from oxygen and moisture a bichloride of a metal of group II—B in the long periods of the periodic table with an alkylaluminum sesquichloride in an anhydrous inert organic liquid solvent therefor, the alkyl group in said alkylaluminum sesquichloride containing from 1 to 3 carbon atoms, and isolating the resulting hydrocarbometallic chloride.

5. A method for preparing hydrocarbomercury halides which comprises reacting at a temperature below the decomposition temperature of the reactants under an atmosphere free from oxygen and moisture a mercuric halide with an alkylaluminum sesquihalide in an anhydrous inert organic liquid solvent therefor, the halogens in both of said reactants having an atomic number between 16 and 54, and isolating the resulting hydrocarbomercury halide.

6. A method for preparing hydrocarbomercury chlorides which comprises reacting in dry cyclohexane at a temperature below the decomposition temperature of the reactants under an atmosphere free from oxygen and moisture mercuric chloride with an alkylaluminum sesquichloride in which the alkyl group contains from 1 to 3 carbon atoms, and isolating the resulting hydrocarbomercury chloride.

7. A method for preparing methylmercuric chloride which comprises reacting in dry cyclohexane at a temperature below the decomposition temperature of the reactants under an atmosphere free from oxygen and moisture mercuric chloride with methylaluminum sesquichloride, and isolating the resulting methylmercuric chloride.

8. A method for preparing hydrocarbomercury iodides which comprises reacting in dry cyclohexane at a temperature below the decomposition temperature of the reactants under an atmosphere free from oxygen and moisture mercuric iodide with an alkylaluminum sesquiiodide in which the alkyl group contains from 1 to 3 carbon atoms, and isolating the resulting hydrocarbomercury iodide.

9. A method for preparing hydrocarbomercury halides which comprises reacting at a temperature below the decomposition temperature of the reactants under an atmosphere free from oxygen and moisture a mercuric halide with a trialkylaluminum compound in an anhydrous inert organic liquid solvent therefor, said trialkyl aluminum compound containing in each alkyl group thereof from 1 to 3 carbon atoms, the halogen in said mercuric halide having an atomic number between 16 and 54, and isolating the resulting hydrocarbomercury halide.

RICHARD V. LINDSEY, Jr.

(References on following page)

REFERENCES CITED

The following references are of record in the file of this patent:

UNITED STATES PATENTS

| Number | Name | Date |
|---|---|---|
| 1,874,260 | Englemann et al. | Aug. 30, 1932 |
| 1,987,685 | Kharasch | Jan. 15, 1935 |
| 2,052,889 | Loder et al. | Sept. 1, 1936 |
| 2,270,292 | Grosse | Jan. 20, 1942 |
| 2,271,956 | Ruthruff | Feb. 3, 1942 |
| 2,388,428 | Mavity | Nov. 6, 1945 |

OTHER REFERENCES

Grignard et al., "Bull. Soc. Chim. France," vol. 37 (1925), page 1384.

Grosse et al., Jour. Org. Chem., vol. 5, pages 106–121 (1940).

Gilman et al., Jour. Org. Chem., vol. 4, pages 162–168.